United States Patent
Takeuchi et al.

(10) Patent No.: US 6,728,183 B1
(45) Date of Patent: Apr. 27, 2004

(54) OPTICAL DISK DEVICE

(75) Inventors: Hitoshi Takeuchi, Kitakatsuragi-gun (JP); Junsaku Nakajima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/512,558

(22) Filed: Feb. 24, 2000

(30) Foreign Application Priority Data

Mar. 2, 1999 (JP) ............................................. 11-053427

(51) Int. Cl.$^7$ ............................................. G11B 7/125
(52) U.S. Cl. ................. 369/53.27; 369/47.51; 369/47.52; 369/53.26; 369/116
(58) Field of Search ............................. 369/116, 54, 58, 369/100, 47.51, 47.52, 53.27, 53.26; G11B 7/125

(56) References Cited

U.S. PATENT DOCUMENTS

| | | | |
|---|---|---|---|
| 4,689,795 A | | 8/1987 | Yoshimoto et al. ............ 372/31 |
| 4,796,267 A | * | 1/1989 | Yamada et al. .............. 369/116 |
| 4,843,604 A | * | 6/1989 | Fujiwara et al. ............. 369/116 |
| 5,029,155 A | | 7/1991 | Kenjo ........................ 369/116 |
| 5,175,722 A | * | 12/1992 | Minami et al. .............. 369/116 |
| 6,317,405 B1 | * | 11/2001 | Arai ........................... 369/116 |

FOREIGN PATENT DOCUMENTS

| | | |
|---|---|---|
| EP | 60032145 | 2/1985 |
| EP | 0314390 | 10/1988 |
| EP | 09288840 | 11/1997 |
| JP | 61-180944 | 8/1986 |
| JP | 4-345930 | 12/1992 |
| JP | 5-36109 | 2/1993 |
| JP | 5-89506 | 4/1993 |
| JP | 5-94634 | 4/1993 |
| JP | 5-94635 | 4/1993 |
| JP | 5-94636 | 4/1993 |
| JP | 5-258384 | 10/1993 |
| JP | 7-220298 | 8/1995 |
| JP | 9-288840 | 11/1997 |
| JP | 11-134692 | 5/1999 |
| JP | 11-185275 | 7/1999 |
| JP | 11-213429 | 8/1999 |

* cited by examiner

Primary Examiner—David Hudspeth
Assistant Examiner—Rocio Colon
(74) Attorney, Agent, or Firm—David G. Conlin; David A. Tucker; Edwards & Angell, LLP

(57) ABSTRACT

An optical device to control the output power of a laser on recording and reproduction without expensive high-speed circuits is provided. The optical disk device of the present invention comprises monitor portion for monitoring the power of laser light, averaged light quantity calculating portion for calculating the averaged light quantity of the power of the laser light, memory portion for memorizing the averaged light quantity, error quantity calculated portion for calculating the difference between the output signals of the averaged light quantity calculating portion and the memory portion, and laser power control portion for controlling the power of the laser light in response to the output signal from the error quantity calculating portion.

21 Claims, 5 Drawing Sheets

OPTICAL DISK DEVICE

BACKGROUND OF THE INVENTION

The present invention relates to an optical disk device used in particular to an apparatus and method of controlling the output power of a laser on recording and reproduction of signals to and from an optical disk.

Prior art method of recording information on a disk in a recording area by using laser light includes magneto-optical recording method and phase change recording method. Both methods record information on a recording layer by focussing a laser light upon the recording layer to heat it. In these recording methods, the distribution of the temperature over the recording layer will give a large influence upon the shape of a recording mark, that is, the quality of reproduced signals. The factors, which determine the temperature distribution, include the pulse width and power of recording light, etc. The current-emitted power characteristics of the semiconductor laser depends upon the temperature. Since the laser light having a power, which is ten times larger than that on reproduction, is necessary on recording, heating of the semiconductor laser becomes larger so that the temperature of the semiconductor laser is elevated. As a result, the current-emitted power characteristics may change. Accordingly, in order to record information in a good manner, it is also necessary to control the power of emitted light of the semiconductor laser on recording.

Under such a circumstance, a method of power control on recording has been proposed as is represented by Japanese Laid-Open Patent Publication No. 09-288840.

Now, a prior art power control system, which is disclosed in the above-mentioned publication, will be described.

FIGS. 1 and 2 are a block diagram and timing chart showing the prior art power control system, respectively.

In FIG. 1, a laser light emitted from a semiconductor laser 4 is passed through a collimator lens (not shown) and a rise mirror and focussed on a recording layer of an optical disk by portion of an objective lens. A part of the laser light is split in the course of its optical path and is incident upon a photodiode 5. On reproduction, the semiconductor laser 4 is supplied with a current which is obtained by voltage/current converting by portion of a V/I converting circuit 3 an output of the adding circuit 2 which is a sum of an output of a reproduced power presetting circuit 1 and an output of an amplifying circuit 13-1 which will be described hereafter, so that the laser generates a laser light having a power depending upon the supplied current value. A current output from the photodiode 5 is converted into a voltage signal by portion of an I/V converting circuit 6, and is then input to S/H (sample and hold) circuits 21-1-3. The S/H circuit 21-1 samples/holds the output from the I/V converting circuit 6 in response to timing pulses from a timing pulse generating circuit 11 for outputting it to a subtracting circuit 12-1.

Since timing pulses each having a given period are input to the S/H circuit 21-1 from the timing pulse generating circuit 11, the output of the S/H circuit 21-1 becomes an output signal of the I/V converting circuit 6, that is, the signal which is obtained by sampling/holding the magnitude of the light emitted from the semiconductor laser 4 at intervals of a given period of time.

In a subtracting circuit 12-1, the output signal from the S/H circuit 21-1 is compared with a signal from a reference signal generating circuit 10. The difference is input to an amplifying circuit 13-1 and is amplified at a given gain and then input to an adding circuit 2.

In such a manner in a reproducing mode of operation, a closed loop (is formed by a reproduction power presetting circuit 1, adding circuit 2, V/I converting circuit 3, semiconductor laser 4, photodiode 5, I/V converting circuit 6, S/H circuit 21-1, subtracting circuit 12-1, reproducing power reference signal generating circuit 10 and the amplifying circuit 13-1. The power emitted from the semiconductor laser 4 is controlled to a predetermined power.

In recording mode of operation, a peak power ON signal and an erasing power ON signal corresponding to a recording signal and recording gate signal (/WG) are input to current switch circuits 16, 18 from a recording pulse generating circuit 15.

The current switching circuits 16, 18 conducts or blocks the current signals output from the V/I converting circuits 27-1, 27-2 in response to the peak power ON signal and the erase power ON signal to impress the semiconductor laser 4 with it. An output signal from the adding circuit 26-1 which is a sum of the output signal from the peak power presetting circuit 24 and the signal from the amplifying circuit 13-3 is input to the V/I converting circuit 27-1. An output signal from the adding circuit 26-2 which is a sum of the output signal from the erasing power presetting circuit 25 and the signal from the amplifying circuit 13-2 is input to the V/I converting circuit 27-2.

On the other hand, the semiconductor laser 4 is constantly impressed with a current which is obtained by voltage/current converting by the V/I converting circuit 3 the output from the adding circuit 2 which is a sum of outputs of the reproducing power presetting circuit 1 and the amplifying circuit 13-1. When the current switching circuit 16 is turned on, the semiconductor laser 4 is impressed with a sum current of the output currents from the V/I converting circuits 3 and 27-1. When the current switching circuit 18 is turned on, the semiconductor laser 4 is impressed with a sum current of the output currents from the V/I converting circuits 3 and 27-2. Pulse light that is shown in FIG. 2 is emitted from the semiconductor laser 4.

A part of the emitted light is input to the photodiode 5 similarly to the reproducing mode. The photodiode 5 outputs a current corresponding to the incident light quantity to the I/V converting circuit 6. The I/V converting circuit 6 converts the output current from the photodiode 5 into a voltage signal for outputting the signal to the S/H circuits 21-1 through 21-3.

Three kinds of timing pulses are output from the timing signal generating circuit 11. When the pulse emitted light from the semiconductor laser 4 is the reproducing power, a timing pulse for holding the output signal of the I/V converting circuit 6 is output to the S/H circuit 21-1. When the pulse emitted light from the semiconductor laser 4 is the erasing power, a timing pulse for holding the output signal of the I/V converting circuit 6 is output to the S/H circuit 21-2. When the pulse emitted light is the peak power, a timing pulse for holding the output signal of the I/V converting circuit 6 is output to the S/H circuit 21-3. Accordingly, the S/H circuits 21-1 through 21-3 output the output signals of the I/V converting circuit 6 corresponding to the reproducing, erasing and peak powers, respectively.

The output signals of the S/H circuits 21-1 through 21-3 is input to the subtracting circuits 12-1 through 12-3, in which they are compared with the output signals from reproducing power reference signal generating circuit 10, erasing power reference signal generating circuit 22 and peak power reference signal generating circuit 23, respectively. The differences are input to the amplifying circuits 13-1 through 13-3 as the outputs from the subtracting circuits 12-1 through 12-3, respectively.

The amplifying circuits 13-1 through 13-3 amplify the input signals at predetermined gains and output the signals to the adding circuits 2, 26-2 and 26-1.

In the prior art method, the peak, erase and reproducing (bias) powers of the pulse light for recording can be controlled to respective predetermined powers as well as the emitted light power for reproducing by the above-mentioned arrangement.

In the above-mentioned prior art method prior art method, it is necessary for the output signal of the I/V converting circuit 6 to have about the same bandwidth as that of the pulse emitted light of the semiconductor laser 4 as is apparent from FIG. 2.

The pulse width of the pulse light may be about one quarter of the bit period in the narrowest case. If data having a bit period of 40 nsec is recorded, the pulse width would then become 10 nsec at minimum and the output signal of the I/V converting circuit requires a bandwidth which is about 100 MHz.

Accordingly, the photodiode 5 and the I/V converting circuit 6 also require a bandwidth of about 100 MHz and higher. This should be achieved to reduce the cost.

Since it is necessary for the S/H circuits 21-1 to 21-3 to complete the sample/hold operation within 10 nsec or less, the circuits having a faster speed and higher accuracy are required. This should be achieved to reduce the cost.

As mentioned above, the current-output characteristics of the semiconductor laser changes with its temperature. FIG. 3 shows the current-output characteristics of the semiconductor laser 4 when its temperature changes.

Since the threshold current and differential efficiency (gradient) in the current-output characteristics of the semiconductor laser 4 changes with its temperature, the prior art contemplates to compensate for both. As is apparent from FIG. 3, the change in temperature of the differential efficiency is less than the change in temperature of the threshold current.

If the power of the emitted light is represented as Pp when the semiconductor laser 4 is impressed with a current Ip at a given temperature T1, the plot of the current-emittedpower characteristics of the semiconductor laser 4 is shift rightward as shown in FIG. 3 and the gradient changes from a rectilinear line as represented by a broken line to a solid line. Accordingly, only the emitted power of Pp–ΔP1 is obtained with the same current.

If the semiconductor laser 4 is supplied with the current Ip plus the changes in the threshold current ΔIth, the emitted power would become Pp–ΔP2, which approaches the emitted power Pp at temperature T1.

Recently, the deterioration of the quality of the recording mark with respect to the change in the peak power has been reduced by the improvement in the storage medium. It is not advantageous to compensate for the change in temperature in the differential efficiency by using an expensive circuit.

It has been found that the power of the emitted pulse light at beginning of recording is approximately equal to a preset value since the temperature of the semiconductor laser per se does not change so fast.

SUMMARY OF THE INVENTION

The present invention was made under such circumstances. It is an object of the present invention to provide an optical recording/reproducing device which is capable of recording/reproducing information at a practically good quality and which has a structure which is suitable for reduction in cost.

In order to accomplish the above-mentioned object, a first aspect of the present invention provides an optical disk device for recording signals on an optical disk which constitutes a signal recording medium by focussing laser light on the face of said optical disk comprising:

an averaged light quantity calculating portion for determining the averaged light quantity of the laser light by splitting the laser light focussed upon the face of said optical disk and by detecting its low frequency component; a memory portion for outputting the averaged light quantity in a reproducing mode of operation and for memorizing and outputting said averaged light quantity which has been calculated for a first period of time (t1) after the beginning of recording in a mode of recording operation; an error quantity calculating portion for calculating the difference between signals output from said averaged light quantity calculating portion and said memory portion; and laser power control portion for controlling the power of said laser light in response to an output signal from said error quantity calculating portion.

The optical disk device may preferably further include an error quantity holding portion for holding the output value of the signal which is output from said error quantity calculating portion immediately before the beginning of recording and the laser power control portion may be controlled in response to the output signal from said error quantity holding portion for a second period time (t2) after the beginning of recording.

The optical disk device may preferably further include a reference signal generating portion for generating a signal having a predetermined level and in lieu of the output signal from said memory portion, the output signal from said reference signal generating portion may be input to said error quantity detecting portion for a third period of time (t3) after the beginning of recording.

The averaged light quantity-calculating portion may comprise a photoelectric converting portion for converting laser light into a current or voltage signal having a response frequency which is not higher than the lowest frequency of signals to be recorded.

The memory portion may preferably comprise an A/D and a D/A converting portions.

There may be a relation t1<t3≦t2 among said first, second and third periods of time (t1), (t2) and (t3).

In order to accomplish the above-identified object, a second aspect of the present invention provides an optical disk device for recording signals on an optical disk which constitutes a signal recording medium by focussing laser light on the face of said optical disk comprising:

a monitoring portion for splitting the laser light focussed on said optical disk face and for monitoring the power of the laser light; an averaged light quantity calculating portion for calculating the averaged light quantity of the laser light which is detected by said monitoring portion; a memory portion for outputting the averaged light quantity in a reproducing mode of operation of the signals and for memorizing and outputting said averaged light quantity which has been calculated for a first period of time (t1) after the beginning of recording in a mode of recording operation; an error quantity calculating portion for calculating the difference between signals output from said averaged light quantity calculating portion and said recording portion; and a laser power control portion for controlling the power of said laser light in response to an output signal from said error quantity calculating portion.

The optical disk device may preferably further include an error quantity holding portion for holding the output value of the signal which is output from said error quantity calculating portion immediately before the beginning of recording and said laser power control portion may be controlled in response to the output signal from said error quantity holding portion for a second period time (t2) after the beginning of recording.

The optical disk device may preferably further include a reference signal generating portion for generating a signal having a predetermined level and in lieu of the output signal from said recording portion, the output signal from said reference signal generating portion may be input to said error quantity detecting portion for a third period of time (t3) after the beginning of recording.

The averaged light quantity calculating portion may comprise a low-pass filter having a cutoff frequency which is not higher than the lowest frequency of band of signals which are reproduced from said optical disk.

The memory portion may preferably comprise an A/D and a D/A converting portion.

There may be a relation t1<t3≦t2 among said first, second and third periods of time (t1), (t2) and (t3).

It is possible to combine the above-mentioned features as of the present invention as many as possible.

PREFERRED EMBODIMENT OF THE INVENTION

Figure 1:
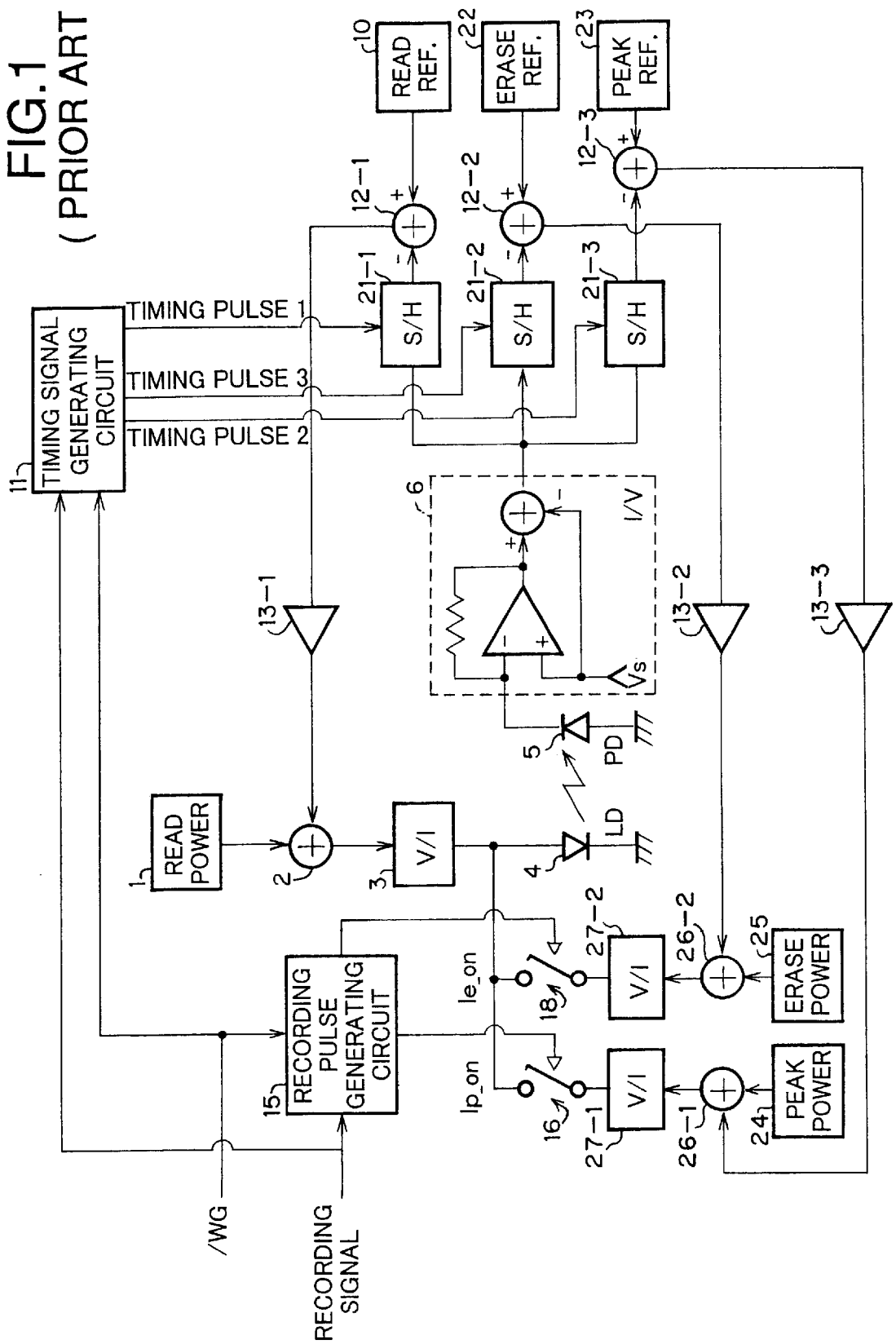
FIG. 1 is a block diagram showing a prior art.
Figure 2:
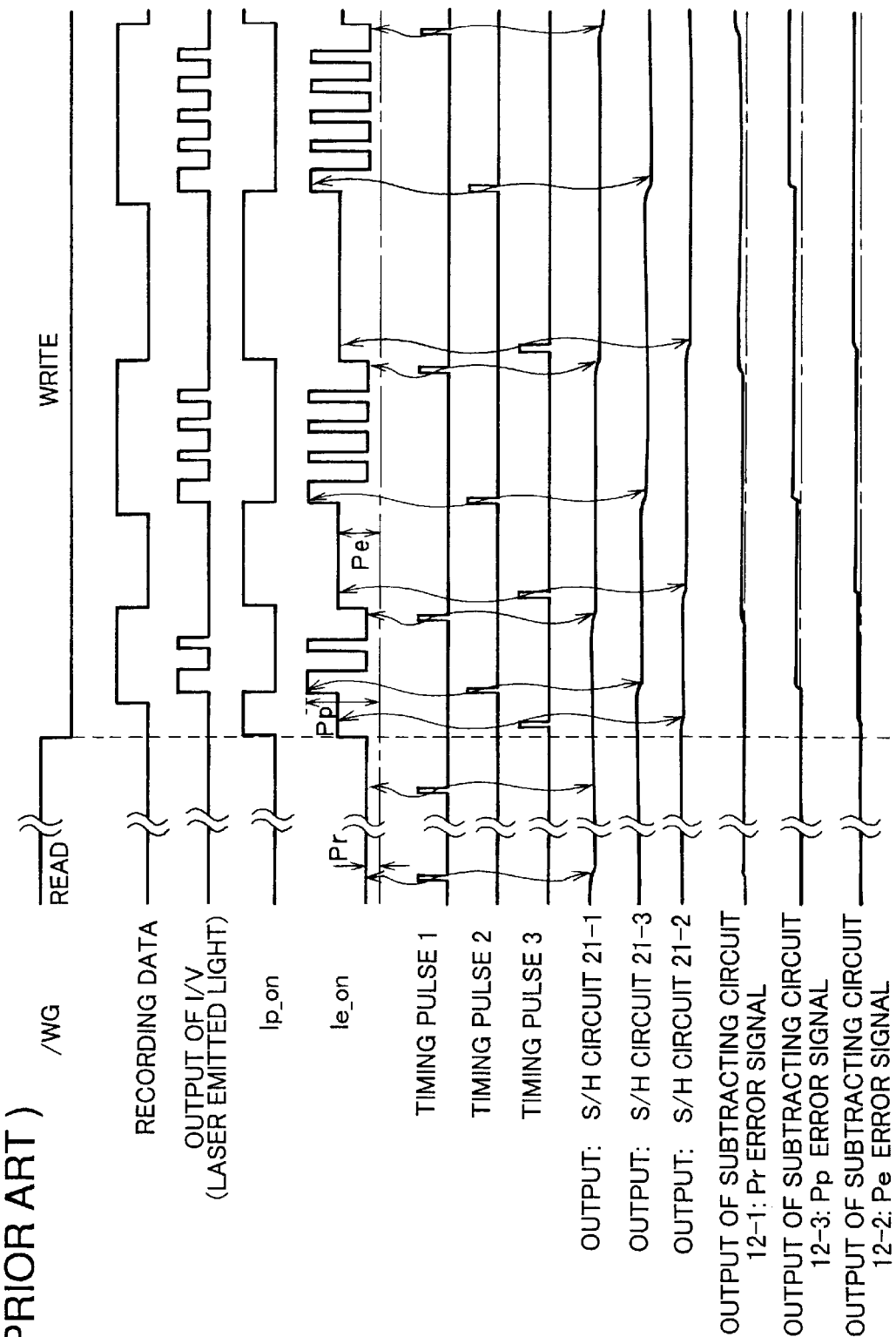
FIG. 2 is a timing chart showing signals at various parts of the block diagram according to the prior art.
Figure 3:
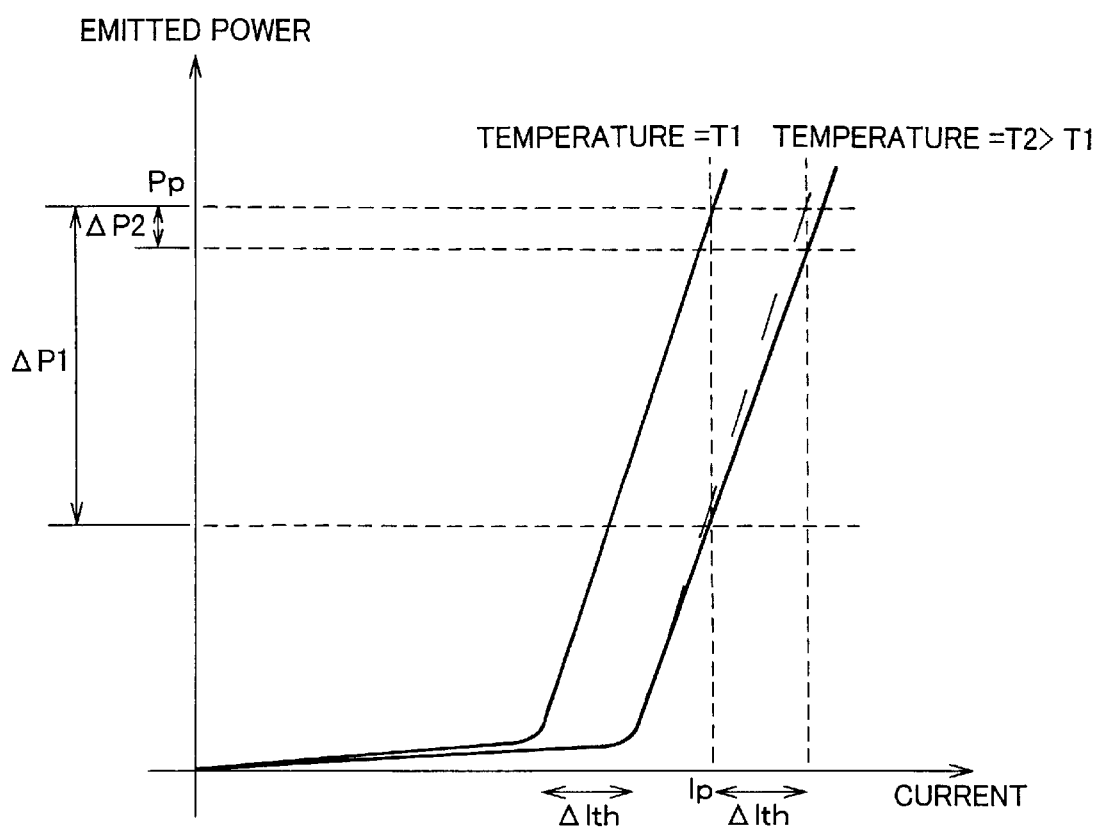
FIG. 3 is a graph showing the current-emitted power characteristics of the semiconductor laser.
Figure 4:
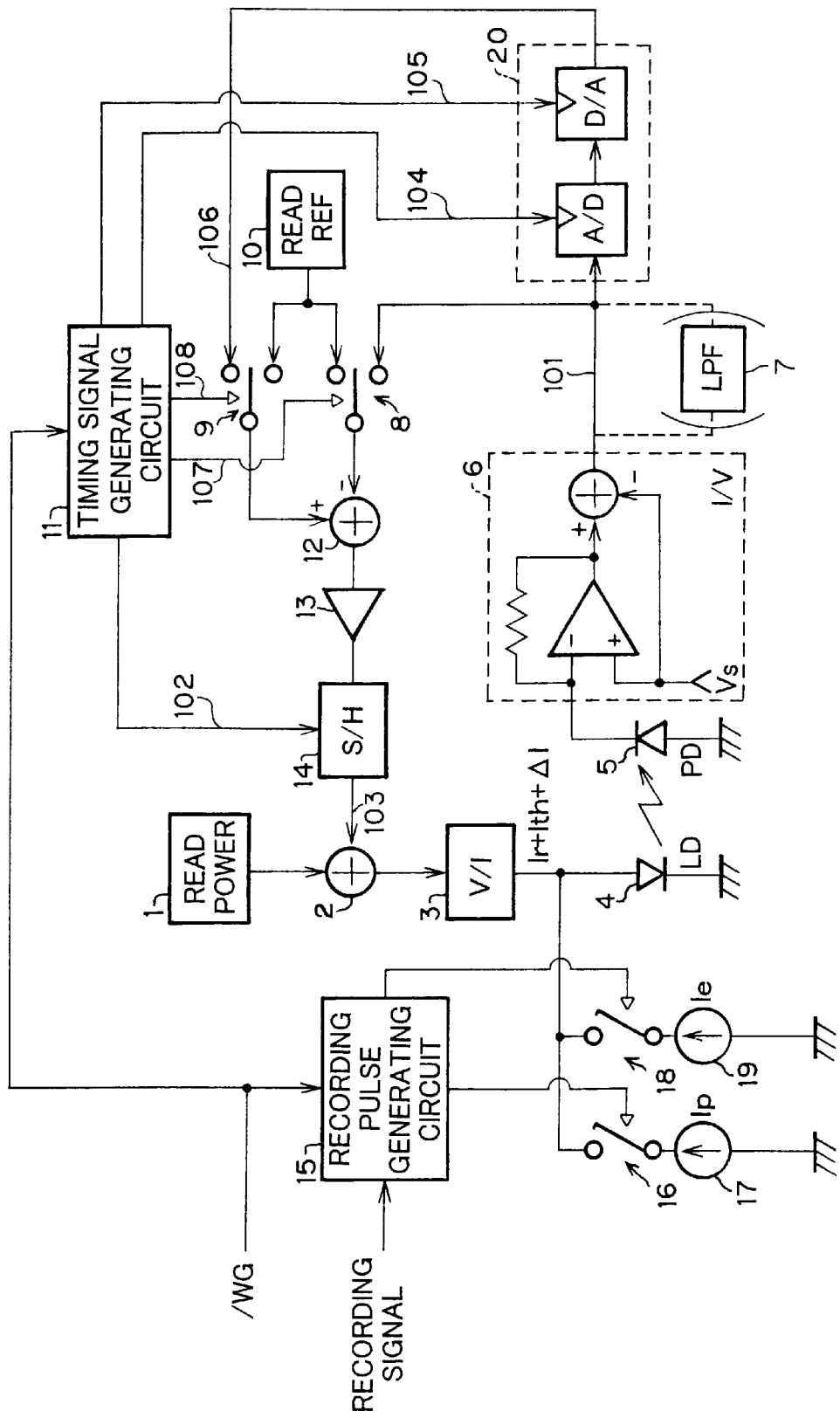
FIG. 4 is a block diagram showing an embodiment of the invention.
Figure 5:
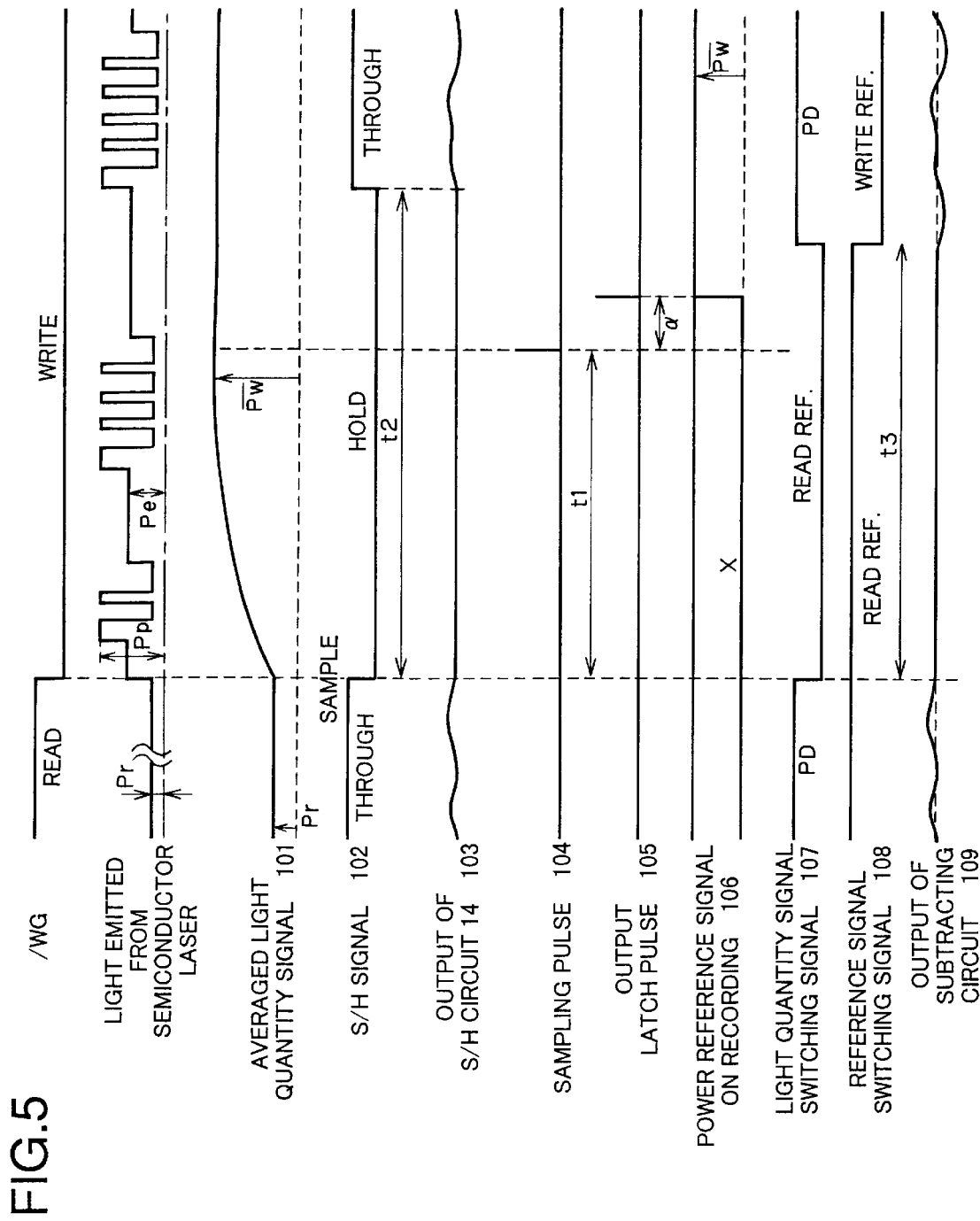
FIG. 5 is a timing chart showing signals at various parts of the block diagram according to the present invention.

Now, an embodiment of the invention will be described with reference to drawings. FIG. 4 is a block diagram showing an embodiment of the present invention and FIG. 5 is a timing chart showing signals at various parts in FIG. 4. Components in FIG. 4 which are similar to those in FIG. 1 are represented by similar reference numerals.

Now, operation on reproduction will be described.

A V/I converting circuit 3 voltage-current converts an output signal from an adding circuit 2, which is a result of addition of an output signal from a reproducing power (read power) presetting circuit 1 and an output signal from an S/H circuit 14 which will be described hereafter and supplies a semiconductor laser 4 with the converted current.

The semiconductor laser 4 emits laser light having a power corresponding to the supplied (impressed) current quantity and part of the light is input to a photodiode 5.

The photodiode 5 is an inexpensive low speed photodiode and detects the low frequency components of the input light, that is, the averaged light quantity for outputting a current which is proportional to the averaged light quantity to an I/V converting circuit 6. The I/V converting circuit 6 converts the output current from the photodiode 5 which is proportional to the input averaged light quantity into a voltage signal for outputting it to a selecting circuit 8 and memory circuit 20 as an averaged light quantity signal 101.

An output of a reproducing power reference signal generating circuit 10 which generates a reference signal corresponding to a desired reproducing power is applied to the other input of the selecting circuit 8. In a reproducing mode of operation, the selecting circuit 8 selects only the output of the I/V converting circuit 6 in response to a light quantity signal selecting signal 107 output from the timing signal generating circuit 11.

Output signals of the reproducing power reference signal generating circuit 10 and the memory circuit 20 are input to the selecting circuit 9. In a reproducing mode of operation, the selecting circuit 9 selects the output from the reproducing power reference signal generating circuit 10 in response to a reference signal-selecting signal 108.

The output signal of the selecting circuit 8, that is, the output signal of the I/V converting circuit 6 and the output signal for the selecting circuit 9, that is, the output signal of the reproducing power reference signal generating circuit 10 are input to a subtracting circuit 12. An output from the subtracting circuit 12 which is representative of the difference between both signals is amplified by an amplifying circuit 13 with a predetermined gain and is then input to an S/H circuit 14.

Since the S/H circuit 14 is arranged to output the input signal as it is in a reproducing mode of operation, the output signal of the amplifying circuit 13 is input to the adding circuit 2.

In such a manner, a closed loop is formed by the reproducing power presetting circuit 1, adding circuit 2, V/I converting circuit 3, semiconductor laser 4, photodiode 5, I/V converting circuit 6, selecting circuits 8, 9, reproducing power reference signal generating circuit 10, subtracting circuit 12, amplifying circuit 13 and the S/H circuit 14 in a reproducing mode of operation, so that the power of the emitted light of the semiconductor laser 4 can be controlled to a predetermined reproducing power.

Now, operation in a recording mode of operation will be described.

A recording pulse generating circuit 15 generates a peak power ON signal and erasing power ON signal from an input recording gate signal (/WG) and recording signal and outputs them to current switching circuits 16 and 18, respectively.

The current switching circuit 16 and 18 supply the output currents from peak power presetting current source 17 and erasing power presetting current source 19 to the semiconductor laser 4 in response to the peak power ON signal and erasing power ON signal from the recording pulse generating circuit 15, respectively. The semiconductor laser 4 is also supplied with the current from the V/I converting circuit 3. As a result, this current plus the output current from the peak power presetting current source 17 or the erasing power presetting current source 19 is supplied to the semiconductor laser 4 so that pulse light is emitted from the semiconductor laser 4.

The light emitted from the semiconductor laser 4 is partly input to the photodiode 5 similarly to the reproducing mode of operation. A current signal that is proportional to the averaged light quantity of the incident light is output from the photodiode 5. The output current signal is converted into a voltage signal by the I/V converting circuit 6 and output to the memory circuit 20 and the selecting circuit 8 as a signal representative of the averaged light quantity 101.

The band width of the data which is recorded on the optical disk and the like is generally limited to a predetermined frequency band by the modulation, etc. due to the limitation of capability of the medium and clock reproduction. In order to obtain the averaged light quantity of the semiconductor laser on recording, a photodiode having a cutoff frequency which is not higher than the minimum frequency Of recording signal band width-limited to this predetermined frequency band is required. In the present embodiment, the memory circuit 20 is constituted by an A/D converting circuit and D/A converting circuit. The memory circuit 20 samples the output signal of the I/V converting circuit 6 in synchronization with sampling pulses 104 which are generated from the timing signal generating circuit 11 and outputs the result of sampling to the selecting circuit 9 in synchronization with output latch pulses 105 which are similarly generated from the timing signal generating circuit 11.

When the frequency characteristics of the photodiode 5 is equivalent to that of the first order low-pass filter, the output current I with respect to the input light of the step response having the light quantity P is represented as $$I = P \cdot \alpha \cdot (1 - \exp(-t/\tau)),$$

wherein $\alpha$ denotes the photoelectric converting coefficient and $\tau$ denotes time constant, which is determined as a constant which is specific to the photodiode.

If the cutoff frequency of the first order low-pass filter is represented as fc, the output current at this time is substantially equal (99%) to that when a constant light quantity is input since $$fc = 1/(2\pi \cdot \tau).$$

The time tr which is taken for the output current to become constant is represented as follows.

$$tr = 0.73 \cdot fc$$

Accordingly, the averaged light quantity signal immediately after the start of the recording can be memorized and output by generating a sampling pulse a period of time t1 which is longer than the period of time tr which is taken for the averaged light quantity signal to reach substantially averaged light quantity since the start of recording and by generating the output latch pulse after the sampling operation of the A/D converting circuit is completed.

As mentioned above, the output signal of the memory circuit 20 and the output of the reproducing power reference signal generating circuit 10 are input to the selecting circuit 9. The selecting circuit 9 selects any one of them in response to a reference signal selecting signal 108 output from the timing signal generating circuit 11 for outputting it as a reference signal for power control.

The output signal of the I/V converting circuit 6 and the output of the reproducing power reference signal generating circuit 10 are input to the selecting circuit 8. The selecting circuit 8 selects any one of them in response to a light quantity signal selecting signal 107 output from the timing signal generating circuit 11 for outputting it as a light quantity signal for power control.

This control utilizes the fact that the power of the recording pulse light at the start of recording is substantially equal to the preset value because the change in temperature of the semiconductor laser 4 since the starting of recording is not so fast as mentioned above and enables to control the recording pulse light by memorizing the averaged light quantity at this time and by using it as the subsequent reference signal of the recording pulse light.

However, no reference signal of the power control loop exists until the output of the memory circuit 20 is established since the starting of recording. If the period of time which is taken for the output of the memory circuit 20 to be established immediately after the starting of recording is represented as t3 (>t1), the selecting circuits 8 and 9 select the output signal of the reproducing power reference signal generating circuit 10 as the light quantity signal and the reference signal until t3 sec has passed.

This enables to make the difference between the reference signal and the light quantity signal (that is, the power control error) zero for the period of time t3 until the output of the memory circuit 20 is established immediately after the start of recording. The pull in time when the t3 sec has passed and power control during recording is started is shortened. The output signals of the selecting circuits 8 and 9 are input to the subtracting circuit 12.

An operation, (output of the selecting circuit 9) minus (output of the selecting circuit 8), is performed in the subtracting circuit 12.

Since the output of the selecting circuit 9 is the reference signal for power control and the output of the selecting 8 is the light quantity signal of the power control as mentioned above, the output signal of the subtracting circuit 12 becomes the power control error signal.

The power control error signal is amplified by the amplifying circuit 13 with a predetermined gain and is then input to the S/H circuit 14.

Power control by the closed loop is impossible since the reference signal of the power control is not established immediately after the starting of recording as mentioned above. The present invention utilizes the fact that the change in temperature of the semiconductor laser is slow. The recording pulse light is emitted by holding the power control error immediately before the starting of recording for this period of time.

In other words, an S/H signal 102 is generated from the timing signal generating circuit 11 for holding the output of the amplifying circuit 13 for only a predetermined period of time t2 ($\geq$t3) immediately after the starting of recording. The S/H circuit 14 outputs the output signal of the amplifying circuit 13 or holds it and outputs it in response to the S/H signal 102.

Power control of the recording pulse light is enabled by memorizing the averaged light quantity signal of the recording pulse light from the semiconductor laser immediately after the start of recording and by using it as the reference signal for power control during recording.

In the present embodiment, the photodiode 5 includes an inexpensive low speed photo detector. Similar advantage can be obtained by making the cutoff frequency of the I/V converting circuit 6 a desired value if the cutoff frequency of the photo detector 5 is higher than the lowest frequency of the signal to be recorded. If the cutoff frequency of the photodiode 5 and the I/V converting circuit 6 is higher than the lowest frequency of the signal to be recorded, similar advantage can be obtained even in an arrangement in which the output signal of the I/V converting circuit 6 is converted to a desired cutoff frequency by the low-pass filter 7 as represented by the broken line in FIG. 4.

Because the averaged light quantity of the laser output for a predetermined period of time since the start of recording is memorized and is used as a reference signal for comparison with the subsequent laser output signal in accordance with the present invention, a reference signal which is more preferable than a predetermined reference signal from the reference signal generator can be obtained.

The averaged light quantity of said laser output is calculated by holding the laser output control signal immediately before the starting of recording. The laser output can be controlled until this signal can be used as the reference signal.

The portion for calculating the averaged light quantity can be implemented in an arrangement suitable for reduction in cost by using an inexpensive low speed photodiode as the photodiode for monitoring the quantity of light emitted from the semiconductor laser, alternatively by making the cutoff frequency of the I/V converting circuit a desired value, or alternatively by using a low-pass filter having a simple structure.

Signals can be recorded by realizing the portion for memorizing the averaged light quantity in combination of A/D converter with D/A converter in a simpler control manner than that using usual memory elements.

Reduction in scale of circuit can be achieved by commonly using the signal of said reference signal generator as the reference signal on reproducing.

In accordance with the present invention, necessity of expensive high speed photo detector, high speed I/V converting circuit and high speed and high accuracy S/H circuit is eliminated. Therefore, an optical disk device that is comparatively simple in structure and is low in cost can be achieved. The present invention is advantageous in compact, light weight and reduction in cost.

What is claimed is:

1. A optical disk device for recording signals on an optical disk which constitute a signal recording medium by focusing laser light on a face of the optical disk comprising:

an averaged light quantity calculating portion for calculating an averaged light quantity of the laser light by splitting the laser light focussed upon the face of the optical disk and by detecting its low frequency component;

a memory portion for outputting the averaged light quantity in a reproducing mode of operation and for memorizing and outputting the averaged light quantity which has been calculated for a first period of time (t1) after a beginning of recording in a recording mode of operation;

an error quantity calculating portion for calculating a difference between output signals from the averaged light quantity calculating portion and the memory portion; and a laser light power control portion for controlling a power of the laser light in response to an output signal from the error quantity calculating portion.

2. An optical disk device as defined in claim 1 further including an error quantity holding portion for holding an output value of signal which is output from the error quantity calculating portion immediately before the beginning of recording and in which the laser power control portion is controlled in response to the output signal from the error quantity holding portion for a second period of time (t2) after the beginning of recording.

3. A optical disk device as defined in claim 1 or 2 further including a reference signal generating portion for generating a signal having a predetermined level and in which in lieu of the output signal from the memory portion, an output signal from the reference signal generating portion is input to the error quantity calculating portion for a period of time (t3) after the beginning of recording.

4. An optical disk device as defined in claim 1 or claim 2 in which the averaged light quantity calculating portion comprises a photoelectric converting portion for converting laser light into a current or voltage signal having a response frequency which is not higher than the lowest frequency of signals to be recorded.

5. An optical disk device as defined in claim 1 or claim 2 in which the memory portion comprises an A/D converting portion and a D/A converting portion.

6. An optical disk device as defined in claim 1 or claim 2 in which there is a relation t1<t3≦t2 among the first, second and third periods of time (t1), (t2) and (t3).

7. An optical disk device as defined in claim 3 in which the averaged light quantity calculating portion comprises a photoelectric converting portion for converting laser light into a current or voltage signal having a response frequency which is not higher than the lowest frequency of signals to be recorded.

8. An optical disk device as defined in claim 7 in which the memory portion comprises an A/D converting portion and a D/A converting portion.

9. An optical disk device as defined in claim 7 in which there is a relation t1<t3≦t2 among the first, second and third periods of time (t1), (t2) and (t3).

10. An optical disk device as defined in claim 3 in which the memory portion comprises an A/D converting portion and a D/A converting portion.

11. An optical disk device as defined in claim 10 in which there is a relation t1<t3≦t2 among the first, second and third periods of time (t1), (t2) and (t3).

12. An optical disk device as defined in claim 3 in which there is a relation t1<t3≦t2 among the first, second and third periods of time (t1), (t2) and (t3).

13. An optical disk device as defined in claim 12 in which there is a relation t1<t3≦t2 among the first, second and third periods of time (t1), (t2) and (t3).

14. An optical disk device for recording signals on an optical disk which constitute a signal recording medium by focussing laser light on a face of the optical disk comprising:

a monitoring portion for splitting the laser light focussed on the optical disk face and for monitoring a power of the laser light;

an averaged light calculating portion for calculating an averaged light quantity of the laser light which is detected by the monitoring portion;

a memory portion for outputting the averaged light quantity in a reproducing mode of operation and for recording and outputting the averaged light quantity which has been calculated for a first period of time (t1) after a beginning of recording in a recording mode of operation;

an error quantity calculating portion for calculating a difference between output signals from the averaged light quantity calculating portion and the memory portion; and a laser light control portion for controlling the power of the laser light in response to an output signal from the error quantity calculating portion.

15. An optical disk device as defined in claim 14 further including an error quantity holding portion for holding an output value of signal which is output from the error quantity calculating portion immediately before the beginning of recording and in which the laser power control portion is controlled in response to the output signal from the error quantity holding portion for a second period of time (t2) after the beginning of recording.

16. A optical disk device as defined in claim 14 or 15 further including a reference signal generating portion for generating a signal having a predetermined level and in which in lieu of the output signal from the memory portion, an output signal from the reference signal generating portion is input to the error quantity calculating portion for a period of time ($t3$) after the beginning of recording.

17. An optical disk device as defined in claim 16 in which the memory portion comprises an A/D converting portion and a D/A converting portion.

18. An optical disk device as defined in claim 16 in which there is a relation $t1 < t3 \leq t2$ among the first, second and third periods of time ($t1$), ($t2$) and ($t3$).

19. An optical disk device as defined in claim 14 in which the averaged light calculating portion comprises a low-pass filter having a cutoff frequency which is not higher than the lowest frequency of signals which are reproduced from the optical disk.

20. An optical disk device as defined in claim 14 or claim 15 or claim 19 in which the memory portion comprises an A/D converting portion and a D/A converting portion.

21. An optical disk device as defined in claim 14 or claim 15 or claim 19 in which there is a relation $t1 < t3 \leq t2$ among the first, second and third periods of time ($t1$), ($t2$) and ($t3$).

* * * * *